US 9,705,544 B2

(12) United States Patent
van de Beek et al.

(10) Patent No.: US 9,705,544 B2
(45) Date of Patent: Jul. 11, 2017

(54) WIRELESS RECEIVER AND METHOD

(71) Applicant: NXP B.V., Eindhoven (NL)

(72) Inventors: Remco van de Beek, Eindhoven (NL);
Jos Verlinden, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/135,653

(22) Filed: Apr. 22, 2016

(65) Prior Publication Data
US 2016/0315646 A1  Oct. 27, 2016

(30) Foreign Application Priority Data

Apr. 23, 2015  (EP) ................................. 15164932

(51) Int. Cl.
*H03K 9/00* (2006.01)
*H03D 1/06* (2006.01)
*H04B 1/12* (2006.01)
*H04B 1/40* (2015.01)
*H04L 27/06* (2006.01)

(52) U.S. Cl.
CPC .............. *H04B 1/12* (2013.01); *H04B 1/40* (2013.01); *H04L 27/06* (2013.01); *H04L 27/066* (2013.01)

(58) Field of Classification Search
USPC ....... 375/219, 222, 259, 261, 268, 284, 285, 375/295, 296, 298, 300, 316, 320, 322, 375/326, 327, 339, 340, 342, 346, 354, 375/362, 220, 221, 233, 232, 240, 240.26, 375/240.27, 324, 350, 348
See application file for complete search history.

(56) References Cited

U.S. PATENT DOCUMENTS 5,282,227 A * 1/1994 Crawford ............ H03D 1/2254
329/307
5,594,389 A   1/1997 Kiyanagi et al.
(Continued)

FOREIGN PATENT DOCUMENTS

EP   1063826 A1   12/2000
WO   9619875 A1   6/1996

OTHER PUBLICATIONS

Remco van de Beek, et al.; "A 13.56Mbps PSK Receiver for 13.56MHz RFID Applications"; IEEE Radio Frequency Integrated Circuits Symposium, pp. 239-242; 2012.
(Continued)

*Primary Examiner* — Linda Wong

(57) ABSTRACT

A receiver and method for a wireless signal transmission system use digital amplitude modulation of a base band signal having a symbol clock frequency. The receiver includes a reference generator which generates a local reference frequency, a mixer to extract the base band signal, a high pass filter to suppress a DC component, an amplifier, an analog-to-digital converter and a digital signal processor to receive digital signals and extract symbols. A base band signal rotation detection circuit detects rotation of the base band signal upstream of the high pass filter. The digital signal processor determines a symbol clock phase by generating a coarse estimate of the symbol clock phase and correcting the coarse estimate based on detected rotations of the base band signal. A determination that the symbol clock phase corresponds to a complete rotation is used in relation to the extraction of symbols.

15 Claims, 5 Drawing Sheets

(56) References Cited

U.S. PATENT DOCUMENTS

| | | | | |
|---|---|---|---|---|
| 6,490,010 | B1* | 12/2002 | Shibuya | H03J 7/02 348/735 |
| 8,064,863 | B1* | 11/2011 | Reed | H04B 1/30 455/285 |
| 8,526,518 | B2* | 9/2013 | Feigin | H04L 27/3863 375/260 |
| 8,837,656 | B2* | 9/2014 | Stojanovic | H03L 7/091 375/355 |
| 9,281,860 | B2* | 3/2016 | Kawasaki | H04B 1/40 |
| 2002/0177450 | A1* | 11/2002 | Vayanos | G01S 11/10 455/456.1 |
| 2003/0087617 | A1* | 5/2003 | Shohara | H03J 7/04 455/192.2 |
| 2004/0066861 | A1* | 4/2004 | Song | H04L 27/2273 375/316 |
| 2004/0258098 | A1* | 12/2004 | Ohkubo | H04B 7/2687 370/503 |
| 2005/0078743 | A1* | 4/2005 | Shohara | H03J 7/04 375/219 |
| 2005/0163251 | A1* | 7/2005 | McCallister | H03F 1/3247 375/296 |
| 2006/0088056 | A1* | 4/2006 | Quigley | H04L 41/142 370/468 |
| 2006/0198449 | A1* | 9/2006 | De Bart | H04L 25/0236 375/260 |
| 2008/0013654 | A1* | 1/2008 | Rick | H03G 3/3068 375/345 |
| 2008/0061870 | A1* | 3/2008 | Tingwu | H04L 27/0014 329/304 |
| 2008/0089443 | A1* | 4/2008 | Sanada | H04L 27/2675 375/319 |
| 2008/0095291 | A1 | 4/2008 | Cafaro et al. | |
| 2008/0152056 | A1 | 6/2008 | Watanabe | |
| 2008/0159123 | A1* | 7/2008 | Tehrani | H04B 7/0848 370/208 |
| 2008/0165899 | A1* | 7/2008 | Rahman | H04B 1/30 375/319 |
| 2008/0279221 | A1* | 11/2008 | Wen | H04L 27/2647 370/500 |
| 2009/0274233 | A1* | 11/2009 | Niu | H04L 27/0014 375/267 |
| 2010/0225752 | A1 | 9/2010 | Bench et al. | |
| 2010/0237951 | A1* | 9/2010 | Kwok | H03L 7/095 331/10 |
| 2010/0260233 | A1* | 10/2010 | Luong | H04L 27/0014 375/136 |
| 2011/0002360 | A1* | 1/2011 | Michaels | H04L 9/001 375/132 |
| 2011/0002689 | A1* | 1/2011 | Sano | H04B 10/69 398/44 |
| 2011/0039509 | A1* | 2/2011 | Bruchner | H04B 1/40 455/232.1 |
| 2011/0128992 | A1* | 6/2011 | Maeda | H04B 17/0085 375/130 |
| 2011/0134335 | A1* | 6/2011 | Laurent-Michel | H04B 1/001 348/731 |
| 2011/0222631 | A1* | 9/2011 | Jong | H04L 27/3863 375/316 |
| 2011/0243263 | A1* | 10/2011 | Andgart | H04L 5/0048 375/260 |
| 2012/0008723 | A1* | 1/2012 | Stojanovic | H03L 7/091 375/355 |
| 2012/0008727 | A1 | 1/2012 | Mohajeri et al. | |
| 2012/0230454 | A1 | 9/2012 | Mobin et al. | |
| 2012/0270516 | A1* | 10/2012 | Kang | H04B 1/30 455/233.1 |
| 2014/0021990 | A1* | 1/2014 | Na | H03L 7/10 327/158 |
| 2014/0241442 | A1* | 8/2014 | Ahmadi | H03L 7/00 375/259 |

OTHER PUBLICATIONS

European Search Report, 15164932, Sep. 29, 2015.

* cited by examiner

WIRELESS RECEIVER AND METHOD

CROSS-REFERENCE TO RELATED APPLICATIONS

This application claims the priority under 35 U.S.C. §119 of European patent application no. 15164932.4, filed on Apr. 23, 2015, the contents of which are incorporated by reference herein.

The present specification relates to apparatus and methods, and in particular to receivers, and method of operation, for wireless communications systems using amplitude modulation.

Amplitude modulation is a method for encoding information to be transmitted using a carrier wave signal having a certain carrier frequency. Generally speaking the amplitude of the carrier wave signal is modulated using a baseband signal having a different frequency to the carrier frequency. A particular encoding scheme is used in which data bits are used to represent information to be transmitted. The amplitude modulate carrier wave may then be used to wirelessly transmit the information to a receiver. The receiver may then process the received signal to demodulate it and to extract the sequence of bits encoded by the modulation so as to access the transmitted information.

A symbol clock signal may be used at the transmitter which defines the boundaries between the adjacent data bits which are used to encode, in a variety of different ways, the symbols to be transmitted. The symbol clock signal may be used by the receiver to extract the transmitted data bits so that symbols and transmitted information can be recovered at the receiver.

Examples of wireless data transmission systems which use amplitude modulation, and in particular amplitude shift keying modulation, are near field communication (NFC) systems and radio frequency identification (RFID) systems. However, other wireless data transmission systems may also use amplitude modulation for transmitting information between parts of the system.

According to a first aspect of the present disclosure, there is provided a receiver for a wireless signal transmission system using digital amplitude modulation using a base band signal having a symbol clock frequency, the receiver comprising: an input for connection to an antenna for receiving a wireless signal; a reference generator for generating a local reference frequency signal; a mixer arranged to mix the local reference frequency signal with a received signal to extract the base band signal; a high pass filter arranged to receive the output of the mixer and to suppress a DC component of the extracted base band signal; an amplifier arranged downstream of the high pass filter; an analogue-to-digital converter arranged to convert the output of the amplifier into a digital signal; a digital signal processor arranged to receive the digital signal from the analogue-to-digital converter and configured to extract symbols from the digital signal; and a base band signal rotation detection circuit arranged to detect rotation of the base band signal upstream of the high pass filter and having an output in communication with the digital signal processor, wherein the digital signal processor is further configured to determine a symbol clock phase by generating a coarse estimate of the symbol clock phase using the local reference frequency signal, or a reference frequency signal derived therefrom, and correcting the coarse estimate of the symbol clock phase based on rotations of the base band signal detected by the base band signal rotation detection circuit, and to use a determination that the symbol clock phase corresponds to a complete rotation in relation to the extraction of symbols.

A more accurate determination of the symbol clock phase may be obtained at the receiver by detecting rotation of the base band signal. This may be used by the receiver in relation to the extraction of symbols.

In one or more embodiments, the determination that the symbol clock phase corresponds to a complete rotation may be used to trigger one or more events related to symbol information processing. For example, the determination that the symbol clock phase corresponds to a complete rotation may be used to trigger a symbol slicer. Additionally or alternatively, the determination that the symbol clock phase corresponds to a complete rotation may be used to trigger a decision-feedback equalizer to update its filter coefficients when a new symbol decision is made.

In one or more embodiments, the digital amplitude modulation may in particular be digital amplitude modulation in which a positive in-phase component of the base band signal is used for the digital modulation.

In one or more embodiments, the reference generator may be a local oscillator. The local oscillator may generate an in phase signal and a quadrature signal. The in phase signal and the quadrature signal may be supplied to the mixer to extract an in phase base band signal and a quadrature base band signal.

In one or more embodiments, the base band rotation detection circuit may include a base band signal in phase component detector and/or a base band signal quadrature component detector. The in phase base band signal may be supplied to the base band signal in phase component detector and/or the quadrature base band signal may be supplied to the base band signal quadrature component detector.

In one or more embodiments, the base band rotation detection circuit may include a base band signal in phase component sampler and/or a base band signal quadrature component sampler. The base band signal in phase component sampler and/or the base band signal quadrature component sampler may each be clocked or enabled by the local reference frequency signal, or a reference frequency signal derived therefrom.

In one or more embodiments, the base band signal in phase component detector may be a first comparator and/or the base band signal quadrature component detector may be a second comparator. The first comparator may be arranged to receive the in phase base band signal as an input and/or the second comparator may be arranged to receive the quadrature base band signal as an input.

In one or more embodiments, the base band rotation detection circuit may include a received signal in phase component sampler and/or a received signal quadrature component sampler. The received signal in phase component sampler may be clocked or enabled by the in phase signal output by the local oscillator and/or the received signal quadrature component sampler may be clocked by the quadrature signal output by the local oscillator.

In one or more embodiments, the high pass filter may comprise one or a plurality of capacitors. The or each capacitor may be a DC block capacitor.

In one or more embodiments, the receiver may further comprise a divider component arranged to divide the frequency of the local reference frequency by a factor N and to supply a digital signal processor clock signal to the digital signal processor. The factor N may have a positive integer value. The factor N may have a value in the range 1 to 128. The factor N may have a value of $2^x$ where x is in the range of 0 to 7.

In one or more embodiments, the digital signal processor may be configured to reduce or avoid false detections of completed rotations of the base band signal. The digital signal processor may be configured to use a hysteretic method to correct the coarse estimate of the symbol clock phase.

In one or more embodiments, the digital signal processor may be configured to correct the coarse estimate of the symbol clock phase only if detection of a completed rotation of the base band signal is followed by detection of rotation of the base band signal into a successive quadrant of the imaginary plane of the in phase and quadrature components of the base band signal.

In one or more embodiments, the digital signal processor may be configured to increment the coarse estimate of the symbol clock phase once every cycle of the local reference frequency signal, or a reference frequency signal derived therefrom.

In one or more embodiments, the digital signal processor may be configured to increment the coarse estimate of the symbol clock phase by $2 \times \pi \times N/M$, where N is an integer divisor of the local reference frequency used to produce the derived reference frequency and M is an integer divisor of a carrier frequency.

In one or more embodiments, the digital signal processor may be configured to correct the coarse estimate of the symbol phase by $2 \times \pi/M$ when a completed rotation of the base band signal has been detected, where M is an integer divisor of a carrier frequency.

In one or more embodiments, the digital signal processor may be configured to alter the symbol clock phase by $2\pi$ when it is determined that the magnitude of the symbol clock phase is equal to, or greater than, $2\pi$.

According to a second aspect of the present disclosure, there is provided a package comprising a lead frame and a semiconductor integrated circuit, wherein the semiconductor integrated circuit comprises the receiver of the first aspect of the disclosure and any preferred features thereof.

According to a third aspect of the present disclosure, there is provided an NFC device or an RFID device including a package according to the second aspect.

According to a fourth aspect of the present disclosure, there is provided a method at a receiver for decoding data encoded using a base band signal having a symbol clock frequency and amplitude modulation of a carrier wave, the method comprising: receiving a wireless signal at a receiver; using a local reference frequency signal generated at the receiver to extract the base band signal from the received wireless signal; high pass filtering the extracted base band signal; amplifying the extracted base band signal; converting the amplified extracted base band signal to a digital base band signal; detecting rotation of the base band signal upstream of the high pass filter; generating a coarse estimate of a symbol clock phase using the local reference frequency signal, or a reference frequency signal derived therefrom; correcting the coarse estimate of the symbol clock phase to a corrected symbol clock phase based on detected rotations of the base band signal; and using a determination that the corrected symbol clock phase corresponds to a complete rotation in relation to extracting symbols from the digital base band signals.

Preferred features of the first aspect may also be, or correspond to, preferred counterpart features of the fourth aspect.

Example embodiments of the invention will now be described in detail, by way of example only, and with reference to the accompanying drawings, in which.

Similar items in the different Figures share like reference signs unless indicated otherwise.

Figure 1:
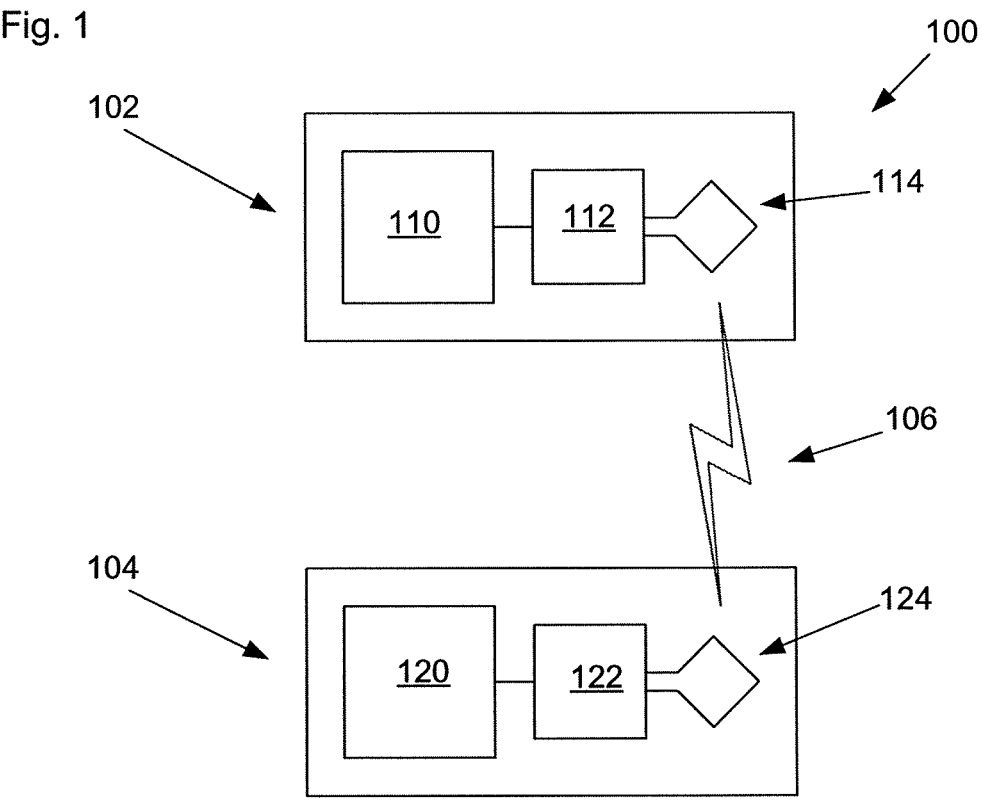
FIG. 1 shows a schematic block diagram of a wireless communication system including a transmitter and a receiver.

With reference to FIG. 1 there is shown a schematic block diagram of a wireless communication system 100 in which the receiver can be used. System 100 includes a transmitting device 102 and a receiving device 104 and a wireless electromagnetic signal 106 can be sent between them. In some embodiments, the wireless communication system 100 may be an RFID system or a Near Field Communication (NFC) system, but the receiver is not necessarily limited in application to such wireless communication systems. The wireless communication system uses amplitude-shift keying (ASK) type digital modulation as a modulation scheme to encode data to be transmitted from the transmitting device 102 to the receiving device 104.

The transmitting device 102 may include a main circuit 110 which realises the overall function of the transmitting device and which may also generate, or otherwise be the source of, the data to be transmitted. The transmitting device 102 also includes a transmitter 112 which generally handles the encoding and transmission of data via an antenna 114, which may be in the form of a loop antenna in NFC embodiments.

Similarly, the receiving device 104 may include a main circuit 120 which realises the overall function of the receiving device and which may be the intended sink or recipient of the data being transmitted. The receiving device 104 also includes a receiver 122 which generally handles the demodulation and decoding of the data received via an antenna 124, which may also be in the form of a loop antenna in NFC embodiments.

As is generally known by a person of ordinary skill in the art, NFC system may generally operate in three different modes: In reader/writer mode, the transmitter or NFC device 102 is capable of reading NFC tags 104. In Peer-to-Peer mode, two NFC devices 10, 104, can exchange data. In card emulation mode, the NFC device 104 appears to an external reader 102 much the same as a conventional contactless smart card. Generally speaking, amplitude modulation is used to encode data by modulating a carrier signal at a frequency of approximately 13.56 MHz±7 kHz. Depending on the data transmission rate being used either Manchester coding or Modified Miller coding may be used to encode the data using amplitude modulation of the carrier signal. The specific coding technique used are not important for the purposes of the receiver or method.

Also, depending on the amplitude modulation scheme being used, a different number of bits may be used to represent each symbol. For example, a two level modulation scheme may use one bit per symbol, whereas a four level modulation scheme may use two bits per symbol. Irrespective, there is also a symbol clock signal, having a fixed frequency, associated with the encoded data and for which, in the time domain, each period of the symbol clock signal is associated with a separate symbol. Hence, the beginning and end of each period of the symbol clock signal corresponds to a potential symbol transition and corresponding potential modulation transition.

When operating in card-emulation mode or peer-to-peer mode, there are two separate frequency references: the frequency reference of the transmitter 102 that generates the carrier signal and also the frequency reference local to receiver 104 and which is used to demodulate the received signal. When amplitude modulation is used, any frequency difference between the reference frequency of the transmitter 102 and the reference frequency of the receiver 104 does not prevent reliable signal reception by itself, since the amplitude of the received signal can be measured even if the phase of the baseband signal used to modulate the carrier varies due to the frequency difference.

However, to reliably extract the transmitted symbols, the receiver 104 needs to recover the symbol clock signal locally, being the clock signal whose edges coincide with the possible symbol transitions and which permits reliable symbol recovery at the receiver. Typically, the period of the symbol clock signal is an integer multiple of the period of the carrier signal. As noted above, as the frequency of the carrier signal is determined by a frequency reference which is local to the transmitter, the symbol clock signal cannot be reliably derived from the frequency reference local to the receiver alone.

Figure 2:
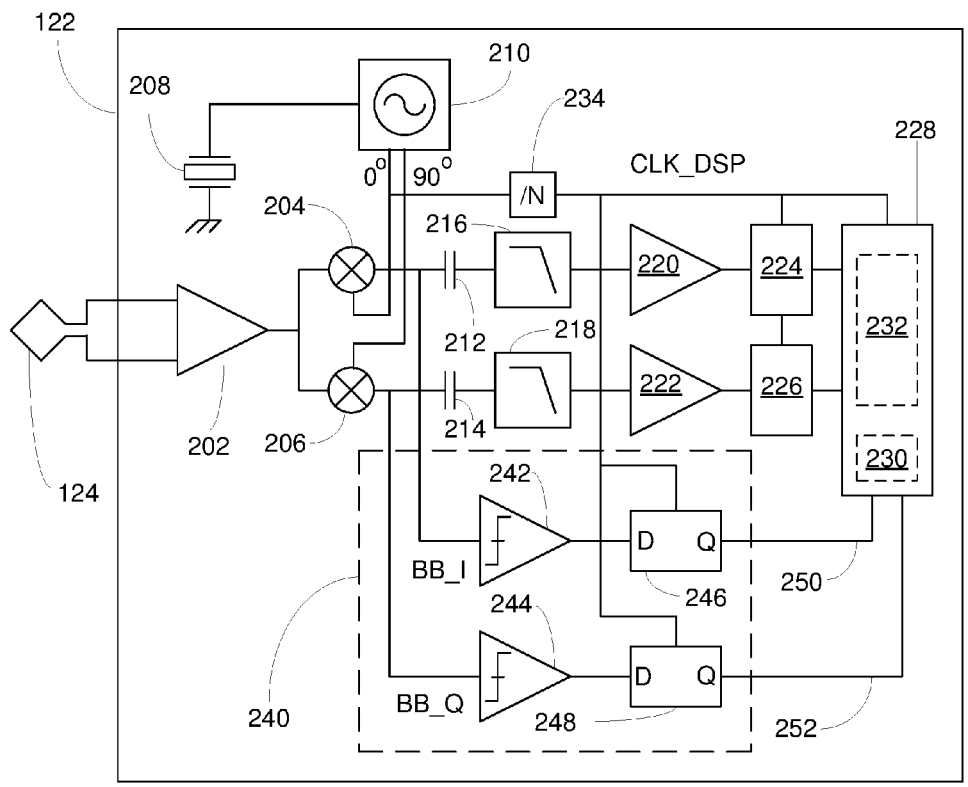
FIG. 2 shows a schematic block diagram of a first example embodiment of a part of the receiver shown in FIG. 1.

FIG. 2 shows a schematic block diagram of the antenna 124 and the receiver 122 being parts of the receiver device 104 of FIG. 1. As noted above antenna 124 may be in the form of a loop antenna and is illustrated separately to the receiver 122 which may be provided partially or wholly as an integrated circuit in a package. Receiver 122 may optionally include a low noise amplifier 202 in some embodiments, the inputs of which are connected to the antenna and the output of which is connected to a first 204 and a second 206 mixer. Receiver 122 includes a crystal oscillator 208 which supplies a stable signal at a local reference signal frequency of 13.56 MHz for an embodiment of an NFC system. Other frequencies may be used in the receiver depending on the reference frequency used by the transmitter. The output of the crystal oscillator 208 is passed to a local oscillator 210. The local reference frequency may be provide by a phase-locked-loop that is locked to the frequency of the crystal oscillator 208 and in which case the phase-locked-loop is represented by local oscillator 210. The local oscillator 210 provides a first output signal, with no additional phase delay, an in-phase signal, and a second output signal, with a 90° phase delay relative to the in-phase signal, a quadrature signal. The frequency of the in-phase local oscillator signal and the quadrature local oscillator second is close to that of the carrier signal. The in-phase local oscillator signal is supplied to the first mixer 204 and the quadrature local oscillator signal is supplied to the second mixer 206.

The output of each mixer 204, 206 is connected to a respective AC coupling capacitor 212, 214, which are each connected to a respective low pass filter 216, 218, the respective outputs of which are each connected to a respective baseband amplifier 220, 222. The respective outputs of the baseband amplifiers 220, 222 are connected to respective analogue to digital converters 224, 226, the respective outputs of which are supplied as in phase and quadrature inputs to a digital signal processor 228. The digital signal processor 228, includes a first phase determining portion 230 which carries out a process to determine locally the phase of the symbol clock signal as described in greater detail below. The digital signal processor also includes a second symbol extraction portion 232 which carries out a process to extract symbols from the signals received from ADCs 224, 226, and which may include various processing blocks used in relation to symbol information processing such as a symbol slicer and a decision-feedback equalizer, and which receives a symbol clock phase trigger signal from the first determining portion 230. Although illustrated in FIG. 2 as separate items, this is simply for clarity of explanation and the first and second portions may in practice be arranged and distributed otherwise in the digital signal processor 228.

The in phase local oscillator signal is also supplied to a divider element 234 which provides a "divide by N" function and reduces the frequency of the in phase local oscillator signal. The output of the divider element 234 is a reduced frequency signal, by a factor of 1/N, and which is supplied as a local DSP clock signal, CLK_DSP, to the digital signal processor 228. Generally speaking N is a fixed value, and in NFC systems is generally a power of 2, i.e. $N=2^x$, where x is a positive integer, as the symbol clock period is also a certain power of two higher than the carrier signal period. The value of N may be in the range of 1 to 128, i.e. x=0 to 7. The DSP clock signal period is typically shorter than the symbol clock period so that there are multiple samples per symbol.

Receiver 122 also includes a rotation detector circuit 240 which is used to detect and measure rotation of the base band modulation signal as will now be described. Rotation detector circuit includes a first in-phase comparator 242 and a second, quadrature comparator 244. The output of the first mixer 204, which corresponds to the in phase component of the baseband modulation signal is supplied to the in phase comparator 242. The output of the second mixer 206, which corresponds to the quadrature component of the base band modulation signal is supplied to the quadrature comparator 244. Each comparator outputs a high signal when its input is positive and outputs a low signal when its input is negative. The output of each comparator 242, 244 is provided as an input to a respective D flip-flop 246, 248 each of which also receives, CLK_DSP as a respective enable or clock signal. The D flip-flops 246, 248 simply resample the output of the comparators into the DSP clock domain. The value of the D-input is captured at some stage of the CLK_DSP clock signal (such as the rising edge) and the captured value becomes the Q output. Hence, the output 250 of 246 is high when the in-phase part of the base band modulation signal is positive and low when the in-phase part of the base band modulation signal is negative. Similarly, the output 252 of 248 is high when the quadrature part of the base band modulation signal is positive and low when the quadrature part of the base band modulation signal is negative.

Figure 3:
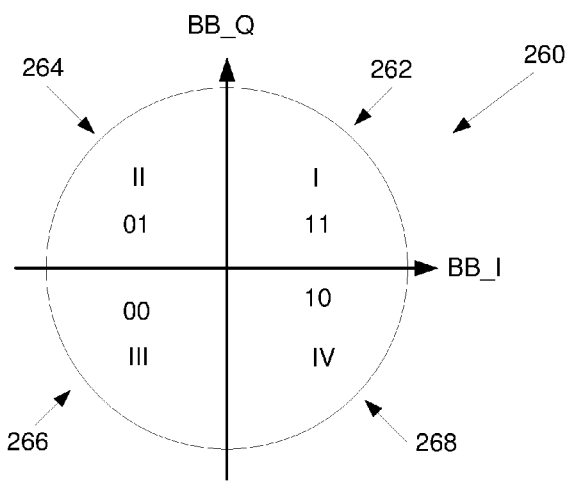
FIG. 3 shows a graphical representation of a complex plane and the components of a base band signal vector.

The values of the outputs 250, 252 of the rotation detector circuit 240 can be used by the DSP 228 to detect rotation of the base band signal as illustrated by FIG. 3. FIG. 3 shows a graphical representation 260 of a space defined by the values of the in phase, BB_I, and quadrature, BB_Q, components of the base band modulation signal. The space is divided into four quarters: a first quarter 262, I, corresponding to positive values of BB_I and BB_Q; a second quarter 264, II, corresponding to negative values of BB_I and positive values of BB_Q; a third quarter 266, I, corresponding to negative values of BB_I and BB_Q; and a fourth quarter 268, IV, corresponding to positive values of BB_I and negative values of BB_Q. Each of these quadrants, I to IV, also has corresponding values of the outputs 250, 252, namely, 11, 01, 00 and 10. Hence, DSP can determine which quadrant the base band signal lies in from the value of inputs 250 and 252. The measured base band signal rotation can be used by the DSP to recover the symbol clock signal locally at the receiver 104 using a method described below.

The general approach of the method is to recover the symbol clock phase used by the transmitter at the receiver by counting local clock periods at the receiver (to provide a coarse estimate of the symbol clock phase) and then correcting for errors due to differences in the frequency used by the local reference of the transmitter (to generate the carrier frequency) and the reference frequency of the receiver (provided by the local oscillator) by determining the phase error through measurement of baseband vector rotation. Hence, the baseband vector rotation at the receiver is measured and is a direct result of the phase difference between the oscillator at the transmitter and the oscillator at the receiver.

The DSP 228 keeps track of the symbol clock used by the transmitter 112, by combining a coarse estimate of that symbol clock phase with the rotation information in order to correct that coarse estimate of the symbol clock phase. The DSP tries to maintain a number, P, that matches the transmitter's symbol clock phase, $\phi_{sym}$. The transmitter's symbol clock phase can be expressed as:

$$\phi_{sym}=2\pi \cdot f_{sym} \cdot t = 2\pi \cdot t \cdot f_c/M$$

with $f_{sym}$ the symbol rate or frequency, and $f_c$ is the carrier frequency, which is some multiple, M, of the symbol frequency. By way of example only, a typical value for M may be 16. If there is a frequency difference, $\delta f$, between the transmitter carrier frequency, $f_c$, and the local oscillator frequency used at the receiver, $f_{LO}$, then the receiver's baseband vector will rotate in the in-phase and quadrature plane (illustrated by FIG. 3) with a rate of $f_{rot}=f_c-f_{LO}$. Using this fact, the symbol clock phase can be re-written as:

$$\phi_{sym}=2\pi t \cdot f_c/M = 2\pi \cdot t \cdot (f_{rot}+f_{LO})/M.$$

The DSP clock signal, CLK_DSP, of the receiver has a frequency of $f_{DSP}=f_{LO}/N$ (from FIG. 2) and so:

$$\phi_{sym}=2\pi \cdot t \cdot (f_{rot}+f_{DSP} \cdot N)/M$$

This equation contains terms that are known to a certain degree of accuracy to the DSP with the quadrant detector present. This equation provides the basis of the simple method for symbol clock phase recovery that is described below.

Generally speaking, at each DSP clock tick, or cycle, the term $t \cdot f_{DSP}$ increases by 1. Therefore, in the absence of any difference in frequency, $\delta f$, the phase of the transmitter's symbol clock will have increased by $2\pi \cdot N/M$. Hence, the first stage in recovering the symbol clock phase is to obtain a coarse estimate, by increasing the receiver's estimate of the symbol clock phase by $2\pi \cdot N/M$ for each DSP clock tick, or cycle. In practice, there will be some finite frequency difference, $\delta f$, present. Therefore, each time the information from the quadrant detector 240 shows that the baseband vector has completed a full rotation anti-clockwise (meaning the term $t \cdot f_{rot}$ has increased by 1), and corresponding to $f_c > f_{LO}$, then the symbol phase has increased by an extra $2\pi/M$, and so the coarse estimate is updated. Alternatively, a full clock-wise rotation, which corresponds to $fc < f_{LO}$, means a correction of $-2\pi/M$ is required to the coarse estimate of the symbol phase.

In the above the phase is expressed in radians (such that $2\pi$ corresponds to a full period of the symbol clock). In practice, an integer number may be used by the DSP to keep track of the phase. This integer can then be mapped to radians implicitly. For example, an integer accumulator can be used that, when reaching some maximum value U, resets itself. This value U then corresponds to a full period of the symbol clock. This can be implemented by logic in the DSP 228 which resets the integer accumulator when an accumulated value of U reaches or exceeds a predetermined limit. For example, expressed in pseudo code: if (accval>=U) then accval:=accval−U.

A full circle rotation of the base band vector can be derived from the inputs 250, 252 delivered by the quadrature detector 240 to the DSP. An anti-clock-wise full-circle rotation is detected whenever a transition from quadrant IV to quadrant I occurs, i.e. a change of the logic state on 250, 252 from 10 to 11. Similarly a clock-wise full-circle rotation is detected whenever a transition from quadrant I to quadrant IV occurs, i.e. a change of the logic state on 250, 252 from 11 to 10.

The reliability of the method can be improved by taking into account the fact that the received signal will be noisy in nature, such that in practice whenever the baseband vector is on the edge between quadrant I and IV, multiple such transitions could be detected. Therefore, hysteresis can be built into the method so that whenever a relevant quadrant transition (IV→I or I→IV) is detected a full-circle rotation is reported, but no further transition can be detected until quadrant II (for an IV→I transition) or III (for an I→IV transition) has been entered, and hence the transition can be considered a genuine event and not the result of noise. This makes the method less sensitive to noise.

The method implemented by DSP to determine the symbol clock phase can be expressed in pseudo code as follows:

```
/*** INIT ***/
P := 0;                              /symbol clock phase estimation/
enable_rot_detect := true;           /Boolean for hysteresis/
quadr_prev := I;                     /for detecting changes in quadrant/
quadr_cur := I;                      /for detecting changes in quadrant/
IF (positive DSP clock edge)         /COARSE UPDATE/
    P := P + 2*pi*N/M;
                                     /FINE UPDATE/
quadr_prev := quadr_cur;             /remember previous value/
quadr_cur := quadr_input;            /take over quadrant detector input/
    IF (quadr_cur == II OR quadr_cur == III)
```

```
        enable_rot_detect := true;   /(re-)enable detection (hyst)/
    ENDIF
    IF (enable_rot_detect)            /hysteresis/
        IF (quadr_prev == I AND quadr_cur == IV) /clock-wise rotation/
            P := P - 2*pi/M;
            enable_rot_detect := false;           /disable detection (hyst)/
        ENDIF
        IF (quadr_prev == IV AND quadr_cur == I)  /anti clock-wise rotation/
            P := P + 2*pi/M;
            enable_rot_detect := false;           /disable detection (hyst)/
        ENDIF
    ENDIF
        / FINALLY, REPORT RECOVERED SYMBOL CLOCK
        TRANSITIONS FOR DSP/
    IF (P >= 2*pi)
        P := P - 2*pi;
        CALL DSP SYMBOL TRANSITION FUNCTIONALITY /Report to DSP
    ENDIF
ENDIF
```

Figure 4:
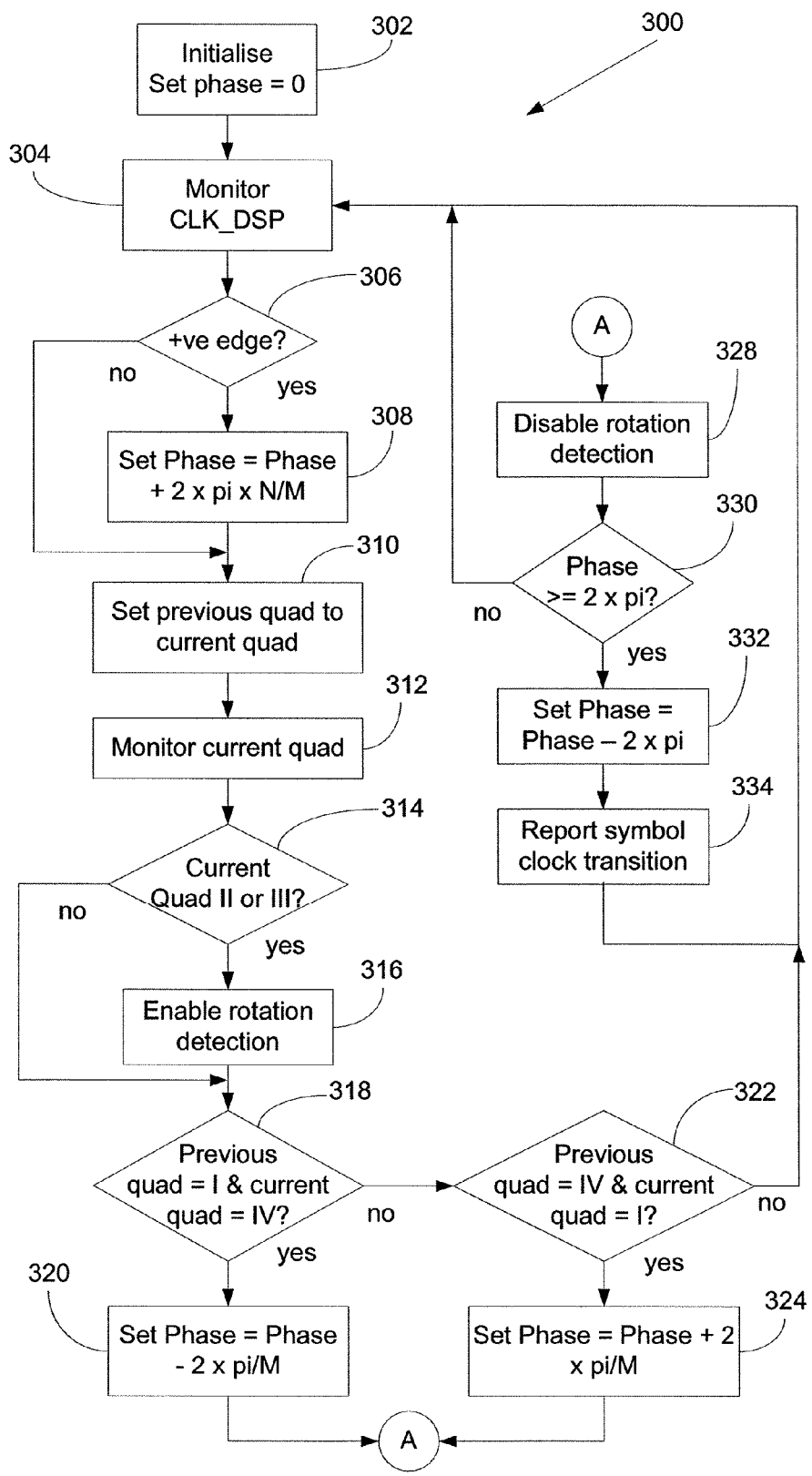
FIG. 4 shows a process flow chart illustrating an example embodiment of a symbol phase determination method which may be implemented in the receiver shown in FIG. 2.

With reference to FIG. 4, there is shown a process flow chart illustrating a data processing method 300 implemented by DSP and corresponding to the same method as implemented in pseudo code above. Any inconsistencies are merely the result of trying to illustrate in flow chart form the operation of software also expressed in pseudo code form. As noted above, the DSP tries to maintain a number, P, that matches the transmitter's symbol clock phase, $\phi_{sym}$, which can be expressed as $\phi_{sym} = 2\pi \cdot f_{sym} \cdot t$ with $f_{sym}$ the symbol rate or frequency. The data processing method 300 outputs an event signal whenever a full symbol clock period is detected at the receiver. This event signal is used to trigger further functionality 232 relating to symbol information processing in the DSP 228 which actually determines the symbol that has been received by the receiver.

At 302 a symbol phase variable, P, is initiated and set to an initial value of zero. At 304, the local oscillator frequency, divided by N, which provides the local DSP clock signal, CLK_DSP, is monitored to detect a positive rising edge. Each time a positive rising edge of the CLK_DSP signal is detected at 306, then the current value of the symbol phase, P, is incremented at 308 by 2×m×N/M, where N is known from divider 234.

The value of M is equal to the number of carrier cycles in one symbol cycle. This is known by the receiver when the receiver knows the symbol rate. This assumption is usually valid because the receiver would need to know the symbol rate to be able to decode the transmitted data. For example, in NFC communication this data rate is negotiated at the start of an information exchange, where this negotiation itself happens at a standardized fixed symbol rate.

At 310, a previous quadrant variable is used to store, or 'remember', the identity of the quadrant that the baseband vector was in for the preceding cycle of the CLK_DSP signal. For example, if the baseband vector was previously determined to have been in quadrant I then the previous quadrant variable is set to indicate quadrant I. Then at 312, for a current cycle of the CLK_DSP signal the current quadrant variable is set to be the current quadrant as determined by monitoring the inputs 250, 252 from the quadrant detector circuit 240.

At 314 it is determined whether the current quadrant indicates a genuine rotation or not. Hence, if the current quadrant were determined at 314 to be IV (previously being I), then this may be simply a noise artefact rather than the beginning of another rotation. Hence, the method continues but rotation detection is not enabled at 316. If at 314, the current quadrant is determined to be II, as inputs 250, 252 are 01, (and the quadrant previously being I), then this appears likely to be a genuine anti-clockwise rotation and hence at 316, rotation detection is enabled. At 318, it is determined by comparison of the current quadrant with the previous quadrant whether a clock wise rotation crossing the base band vector positive, in-phase axis has occurred and if so the phase is corrected at 320 by decreasing P by the amount $2 \times \pi/M$. Otherwise, at 322, it is determined by comparison of the current quadrant with the previous quadrant whether an anti-clock wise rotation crossing the base band vector positive, in-phase axis has occurred and if so the phase is corrected at 324 by increasing P by the amount $2 \times \pi/M$. If no transition between quadrants I and IV is determined at 318 or 322, then there is no fine correction of the current phase value, P, and processing returns to 304.

If the beginning of a new baseband vector anti-clockwise rotation is detected at 318, or clockwise rotation is detected at 322, then after the appropriate fine phase correction at 320 or 324, respectively, processing continues to 328 at which rotation detection is disabled. Hence, a detected transition from I to IV followed by a transition from IV to I, which may be the result of noise, does not give rise to a further fine correction of the phase value. A further fine correction of the phase value only occurs after rotation detection is enabled or re-enabled, once the baseband vector has entered quadrant II or III depending on its sense of rotation.

After rotation detection has been disabled at 328, processing continues at 330 by determining whether the current value of symbol clock phase, P, is equal to or greater than $2 \times \pi$. If not, then processing proceeds back to 304. If the symbol clock phase, P, is equal to or greater than $2 \times \pi$, then at 332, P is decreased by $2 \times \pi$ and at 334 a symbol clock transition is reported to another process within DSP 228. Detection of the passing of one symbol cycle at 334 is used to trigger another process within DSP that determines which symbol was received, such as a symbol slicer used for symbol detection. Monitoring of the DSP clock signal is then continued at 304 and the coarse estimate of the phase, P, is updated in the next positive rising edge of the CLK_DSP.

The recovered symbol clock is used by the digital signal processor to keep track of the symbol grid, for example to trigger a symbol slicer that extracts each data bit from the received input signal. All that DSP 228 needs to be known is when to evaluate the most likely value of the received symbol, so it is sufficient for an event-like signal to be output by process 300. The event-like signal may simply provide a flag that is enabled once every DSP clock cycle to trigger another process, for example the symbol slicer. Hence, the event signal output at 334 triggers the symbol slicer in the DSP to compare the received value to a set of thresholds to determine which symbol was most likely transmitted. Hence, the recovered symbol clock signal is used to trigger the DSP processing block that actually does the extraction.

The determination that the symbol clock phase corresponds to a complete rotation may be used to trigger one or more events related to symbol information processing in the DSP 228. Additionally or alternatively, the determination that the symbol clock phase corresponds to a complete rotation may be used to trigger a decision-feedback equalizer block in the DSP to update its filter coefficients when a new symbol decision is made.

It will be appreciated that although the above described embodiment works in units of radians for determining the magnitude of the phase and changes thereto, in other embodiments, other units of angle can be used, e.g. degrees, or the measure of angle may not be in angular units and there can be a simple mapping or relationship between a value and a corresponding amount of rotation. For example, the value of 1000 can correspond to a complete rotation (360°) such that the value 1 corresponds to 0.36°. Hence, although radians are generally used herein, any values can be used as either a direct, or an indirect, measure of rotation of the base band vector and for the symbol clock phase. When non-angular values are used, they can simply be converted back to a corresponding angular value in order finally to determine the symbol clock frequency.

Figure 5:
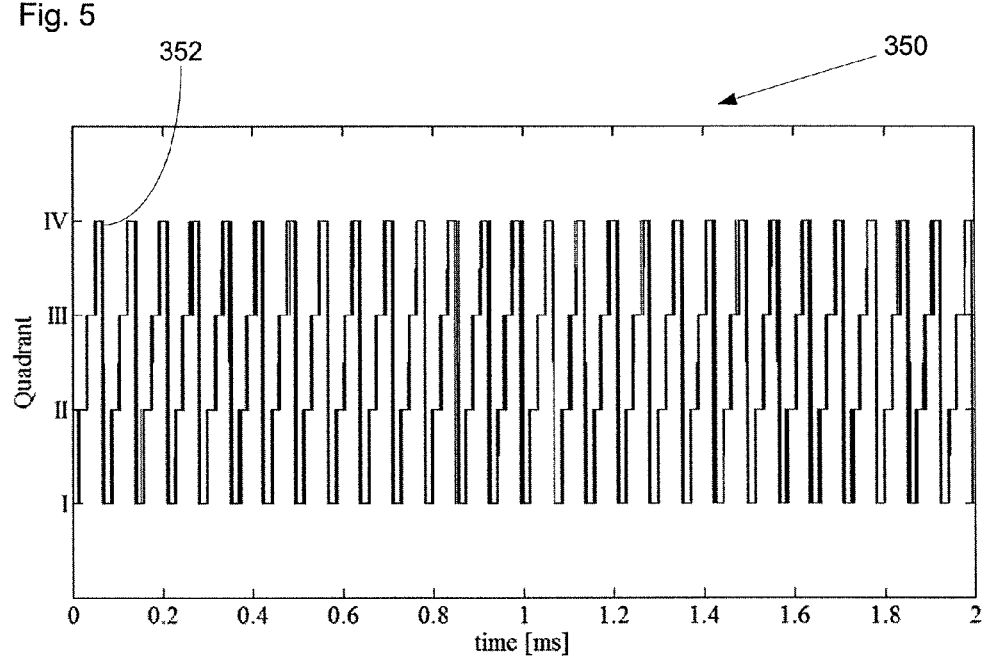
FIG. 5 shows a graph illustrating the rotation of the base band signal vector in the complex plane illustrated in FIG. 3 as a function of time.
Figure 6:
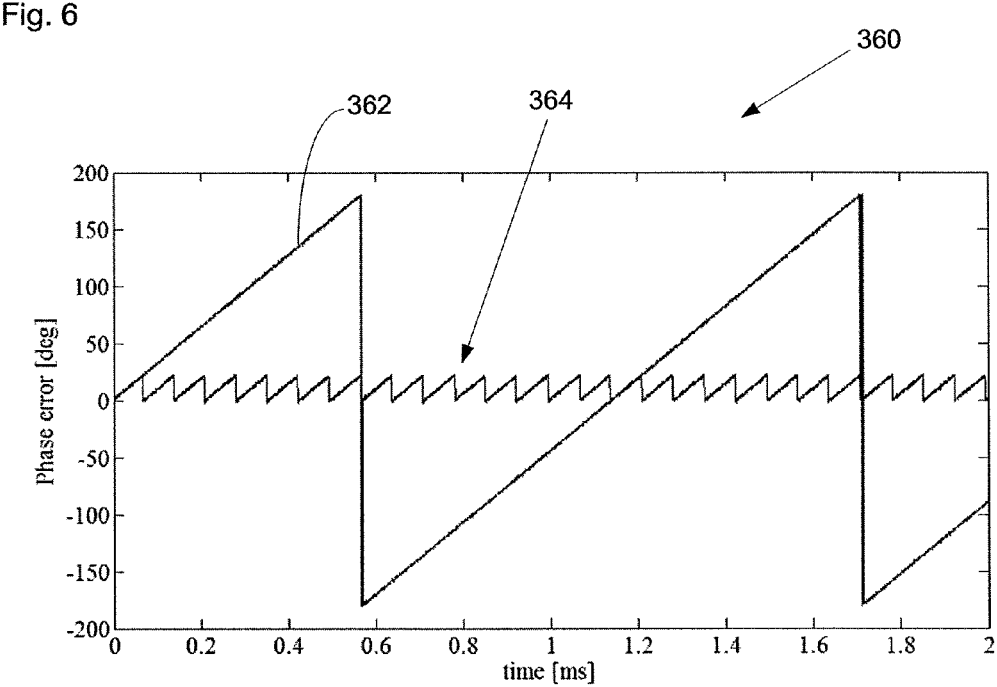
FIG. 6 shows a graph illustrating the value of the symbol clock phase as a function of time with and without the correction of the symbol clock phase.

A simulated result of the result of using the baseband vector rotation detector circuit 240 and method 300 to recover the symbol clock at the receiver is illustrated in FIG. 5 and FIG. 6. The frequency offset or difference, δf, between carrier $f_c$ and local oscillator frequency $f_{LO}(=N\,f_{DSP})$ is 14 kHz in this simulation. FIG. 5 shows a graphical plot 350 of the baseband vector quadrant detected by circuit 240 as a function of time in ms. FIG. 5 shows the output of the quadrature detector 240, also showing the jittery transitions due to noise at the input of the detector. There are fourteen transitions between quadrants IV to I, e.g., transition 352 within 1 ms and hence corresponding to the 14 kHz frequency difference.

FIG. 6 shows a graphical plot 360, the phase difference or error between the actual transmitter side symbol clock phase and the recovered symbol clock phase. A first line 362 corresponds to the cases in which the quadrant detector information and fine phase correction method are not used. Instead, only the coarse phase estimation update is maintained using the CLK_DSP signal, corresponding to step 308 of method 300. In this case, the recovered symbol clock phase error illustrated by line 362 accumulates enough to either skip processing an entire symbol or to process one of the symbols twice. In the second case, illustrated by line 364, and in which the symbol phase fine tuning correction corresponding to steps 320 or 324 of method 300 are used, the reliable detection of baseband vector rotation from the quadrant information allows the symbol phase error to remain bounded, such that each symbol may be processed, exactly once. The higher frequency drops in the saw tooth signal 364 each corresponds to detection of a full-circle rotation of the baseband vector. The frequency of this saw tooth is 14 kHz. The reason why 16 of these saw teeth fit into 1 period of the lower frequency saw tooth 362 is because the symbol rate is fc/M, where M=16 in this example, and so 16 carrier cycles correspond to one symbol cycle.

Figure 7:
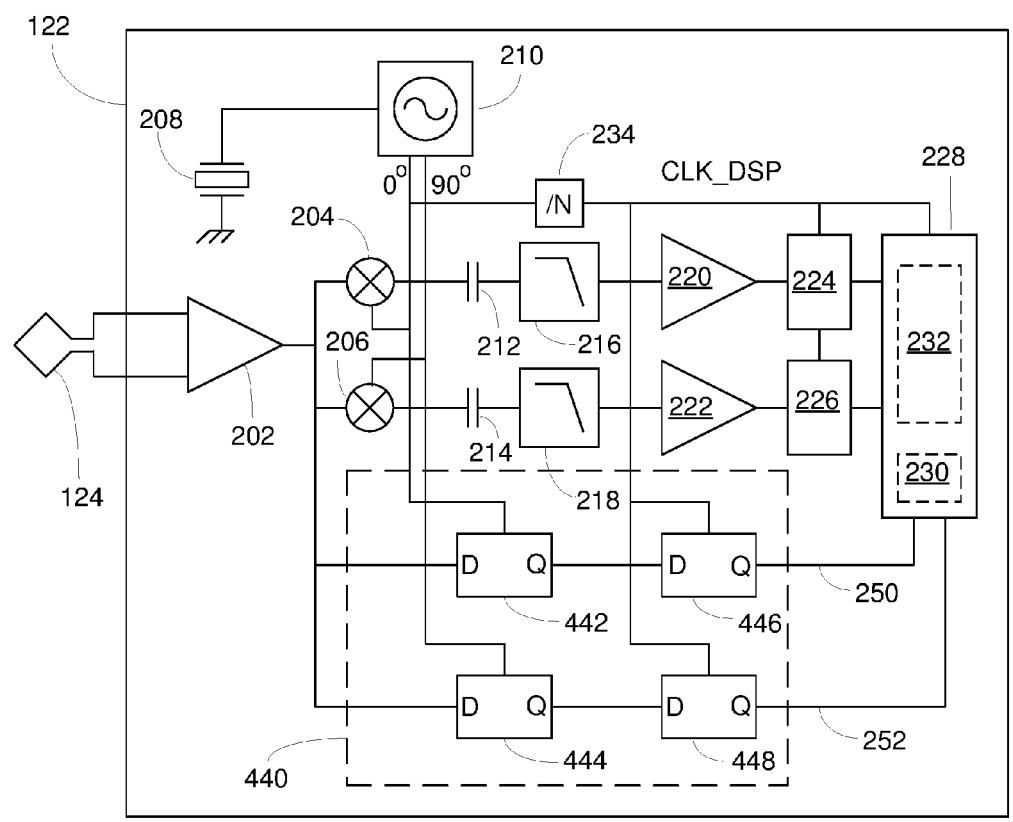
FIG. 7 shows a schematic block diagram of a second example embodiment of a part of the receiver shown in FIG. 1.

FIG. 7 shows a second example embodiment of a receiver 122. The receiver shown in FIG. 7 is substantially the same as the receiver 122 shown in FIG. 2, other than the construction of the rotation detector circuit 440. Hence, only the rotation detector circuit is described here.

Again, the rotation detector circuit 440 is used to detect and measure rotation of the base band modulation signal. Rotation detector circuit includes a first in-phase D flip-flop 442 and a second quadrature D flip-flop 444. The in phase output of the local oscillator 210, which is related to the in phase component of the baseband modulation signal is supplied to the in phase D flip-flop as a clock or enable signal. The quadrature output of the local oscillator 210, which is related to the quadrature component of the base band modulation signal is supplied to the quadrature D flip-flop 444 as a clock or enable signal. Each D flip-flop 442, 444 receives the output of the low noise amplifier 202 as its input. Each D flip-flop 442, 444 will produce and hold a value of '1' on its Q-output at a positive clock edge from the local oscillator 210 when, at the occurrence of this edge, the output of the LNA 202 is positive. Each D-flip-flop 442, 444 will produce and hold a value of '0' on its Q-output at a positive clock edge from the local oscillator 210 when, at the occurrence of this edge, the output of the LNA 202 is negative.

The output of each D flip-flop 442, 444 is provided as an input to a respective further D flip-flop 446, 448 each of which also receives, CLK_DSP as a respective enable or clock signal. The further D flip-flops 446, 448 simply resample the output of the in phase and quadrature D flip flops, 442, 444, into the DSP clock domain. The value of the D-input is captured at some stage of the CLK_DSP clock signal (such as the rising edge) and the captured value becomes the Q output. Hence, the output 250 of 446 is high when the in-phase part of the base band modulation signal is positive and low when the in-phase part of the base band modulation signal is negative. Similarly, the output 252 of 448 is high when the quadrature part of the base band modulation signal is positive and low when the quadrature part of the base band modulation signal is negative. Hence, the logic levels of signals 250, 252 indicate the quadrant in which the base band vector currently lies as described above.

Trying to deriving the symbol clock frequency directly from the incoming antenna signal, for example by using a frequency divider clocked by the low noise amplifier 202 output, would be unreliable in modern receivers in which there is a drive to decrease the physical antenna size and, consequently, the amplitude of the received signal. Further, any noise or supply bounce, present in the receiver may result in additional spurious zero-crossings at the low noise amplifier 202 output, which would cause the frequency divider to fail.

For non-return-to zero (NRZ) bit coding, such as used in ISO14443 type-B communication, a DSP would not reliably be able to recover the symbol clock signal. If the AC coupling capacitors 212, 214, were omitted, then this may be possible because the rotation of the complex (in-phase & quadrature) input vector includes the information of the frequency difference between the carrier frequency and local oscillator frequency. However, since this frequency difference will in practice be low, the rotation information will be strongly attenuated by the AC coupling capacitors 212, 214, rendering DSP based symbol clock recovery infeasible.

Removing or bypassing the AC coupling capacitors 212, 214 to address this may be considered, but the very rotation that should be included in the signal passed toward the DSP requires higher dynamic range of the ADCs, 224, 226. This is because the frequency difference (which causes the rotation of the complex baseband vector) causes a beat tone on top of the signal, which typically is close to an order of magnitude greater higher in amplitude than the signal itself, for example for ASK modulation in case of type-B communication.

Hence, the approach of the method allows symbol clock recovery at the receiver without removal or bypassing of the AC coupling capacitors and also does not require an increase in the dynamic range requirement of the ADCs. The AC coupling may be retained to maximize the ADC output signal-to-quantization-noise ratio, given its number of bits. The rotation of the baseband signal (being a measure for the difference in the relevant frequencies used by the transmitter and receiver) is measured by dedicated circuit and this measurement is then post-processed by the DSP. The use of high-pass filtering (in the form of AC coupling) suppresses DC. This allows the baseband gain to be increased up to the ADCs 224, 226, thus increasing their output SNR. The transmitter-side symbol clock phase is determined at the receiver by counting receiver side clock periods (e.g. of a frequency reference, local oscillator LO signal or DSP clock) to provide a coarse estimate and the error due to frequency difference is corrected by measuring phase error or baseband vector rotation of the received signal before it is high-pass filtered to allow fine correction of the symbol clock phase and its recovery at the receiver.

The receiver and method can be used in various different types of digital amplitude modulation receivers, such as contactless smart cards, UHF RFID tags and NFC devices.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

The invention claimed is:

1. A receiver for a wireless signal transmission system using digital amplitude modulation using a base band signal having a symbol clock frequency, the receiver comprising:
    an input for connection to an antenna for receiving a wireless signal;
    a reference generator for generating a local reference frequency signal;
    a mixer arranged to mix the local reference frequency signal with a received signal to extract the base band signal;
    a high pass filter arranged to receive the output of the mixer and to suppress a DC component of the extracted base band signal;
    an amplifier arranged downstream of the high pass filter;
    an analogue-to-digital converter arranged to convert the output of the amplifier into a digital signal;
    a digital signal processor arranged to receive the digital signal from the analogue-to-digital converter and configured to extract symbols from the digital signal; and
    a base band signal rotation detection circuit arranged to detect rotation of the base band signal upstream of the high pass filter and having an output in communication with the digital signal processor,
    wherein the digital signal processor is further configured to determine a symbol clock phase by generating a coarse estimate of the symbol clock phase using the local reference frequency signal, or a reference frequency signal derived from the local reference frequency signal, and correcting the coarse estimate of the symbol clock phase based on rotations of the base band signal detected by the base band signal rotation detection circuit, and to use a determination that the symbol clock phase corresponds to a complete rotation to extract symbols from the digital signal.

2. The receiver as claimed in claim 1, wherein the reference generator is a local oscillator and can generate an in phase signal and a quadrature signal and wherein the in phase signal and quadrature signal are supplied to the mixer to extract an in phase base band signal and a quadrature base band signal.

3. The receiver as claimed in claim 2, wherein the base band rotation detection circuit includes a base band signal in phase component detector and a base band signal quadrature component detector, and wherein the in phase base band signal is supplied to the base band signal in phase component detector and the quadrature base band signal is supplied to the base band signal quadrature component detector.

4. The receiver as claimed in claim 3, wherein the base band rotation detection circuit includes a base band signal in phase component sampler and a base band signal quadrature component sampler, and wherein the base band signal in phase component sampler and the base band signal quadrature component sampler are each clocked by the local reference frequency signal, or a reference frequency signal derived from the local reference frequency signal.

5. The receiver as claimed in claim 3, wherein the base band signal in phase component detector is a first comparator and the base band signal quadrature component detector is a second comparator, and wherein the first comparator is arranged to receive the in phase base band signal as an input and the second comparator is arranged to receive the quadrature base band signal as an input.

6. The receiver as claimed in claim 3, wherein the base band rotation detection circuit includes a received signal in phase component sampler and a received signal quadrature component sampler, and wherein the received signal in phase component sampler is clocked by the in phase signal output by the local oscillator and the received signal quadrature component sampler is clocked by the quadrature signal output by the local oscillator.

7. The receiver as claimed in claim 1, and further comprising a divider component arranged to reduce the frequency of the local reference frequency by a factor N and to supply a digital signal processor clock signal to the digital signal processor.

8. The receiver as claimed in claim 1, wherein the digital signal processor is configured to use a hysteretic method to correct the coarse estimate of the symbol clock phase.

9. The receiver as claimed in claim 8, wherein the digital signal processor is configured to correct the coarse estimate of the symbol clock phase only if detection of a completed rotation of the base band signal is followed by detection of rotation of the base band signal into a successive quadrant of the imaginary plane of the in phase and quadrature components of the base band signal.

10. The receiver as claimed in claim 1, wherein the digital signal processor is configured to increment the coarse estimate of the symbol clock phase once every cycle of the local reference frequency signal, or a reference frequency signal derived from the local reference frequency signal.

11. The receiver as claimed in claim 10, wherein the digital signal processor is configured to increment the coarse estimate of the symbol clock phase by $2 \times \pi \times N/M$, where N is an integer divisor of the local reference frequency used to produce the derived reference frequency and M is an integer divisor of the carrier frequency corresponding to the symbol clock frequency.

12. The receiver as claimed in claim 1, wherein the digital signal processor is configured to correct the coarse estimate of the symbol phase by $2 \times \pi/M$ when a completed rotation of the base band signal has been detected, wherein M is an integer divisor of the carrier frequency corresponding to the symbol clock frequency.

13. The receiver as claimed in claim 1, wherein the digital signal processor is configured to alter the symbol clock phase by $2\pi$ when the base band signal rotation detection circuit determines that the magnitude of the symbol clock phase is equal to, or greater than, $2\pi$.

14. A package comprising a lead frame and a semiconductor integrated circuit, wherein the semiconductor integrated circuit comprises the receiver of claim 1.

15. A method at a receiver for decoding data encoded using a base band signal having a symbol clock frequency and digital amplitude modulation of a carrier wave, the method comprising:
    receiving a wireless signal at a receiver;
    using a local reference frequency signal generated at the receiver to extract the base band signal from the received wireless signal;
    high pass filtering the extracted base band signal;
    amplifying the extracted base band signal;
    converting the amplified extracted base band signal to a digital base band signal;
    detecting rotation of the base band signal upstream of the high pass filter;
    generating a coarse estimate of a symbol clock phase using the local reference frequency signal, or a reference frequency signal derived from the local reference frequency signal;
    correcting the coarse estimate of the symbol clock phase to a corrected symbol clock phase based on detected rotations of the base band signal; and
    using a determination that the corrected symbol clock phase corresponds to a complete rotation to extract symbols from the digital base band signal.

* * * * *